United States Patent [19]

Scherabak

[11] Patent Number: 4,998,376

[45] Date of Patent: Mar. 12, 1991

[54] INSECT TRAP

[76] Inventor: Jack Scherbak, 6250 Sunrise Rd., Lincoln, Nebr. 68510

[21] Appl. No.: 514,085

[22] Filed: Apr. 25, 1990

[51] Int. Cl.$^5$ ............................................. A01M 1/10
[52] U.S. Cl. .......................................... 43/61; 43/66; 43/121
[58] Field of Search ................. 43/61, 64, 66, 67, 107, 43/121, 132.1

[56] References Cited

U.S. PATENT DOCUMENTS 3,747,260  7/1973  Lovness ............................. 43/132.1

FOREIGN PATENT DOCUMENTS 1274606  5/1972  United Kingdom .................... 43/61

Primary Examiner—Richard K. Seidel
Assistant Examiner—Timothy M. Boynton
Attorney, Agent, or Firm—Zarley, McKee, Thomte, Voorhees & Sease

[57] ABSTRACT

An insect trap includes a lightweight base having a lightweight cover formed of a flexible sheet material. The cover is affixed along portions of the base's continuous edge, and inlcudes flap portions folded between the cover and base. The cover is affixed to the base such that the fold between each flap portion and the cover is arched upwardly away from the base to create a downward biasing force on each flap portion. This biasing force will return the flap portion into contact with the base once an insect has lifted the flap to enter the trap.

4 Claims, 2 Drawing Sheets

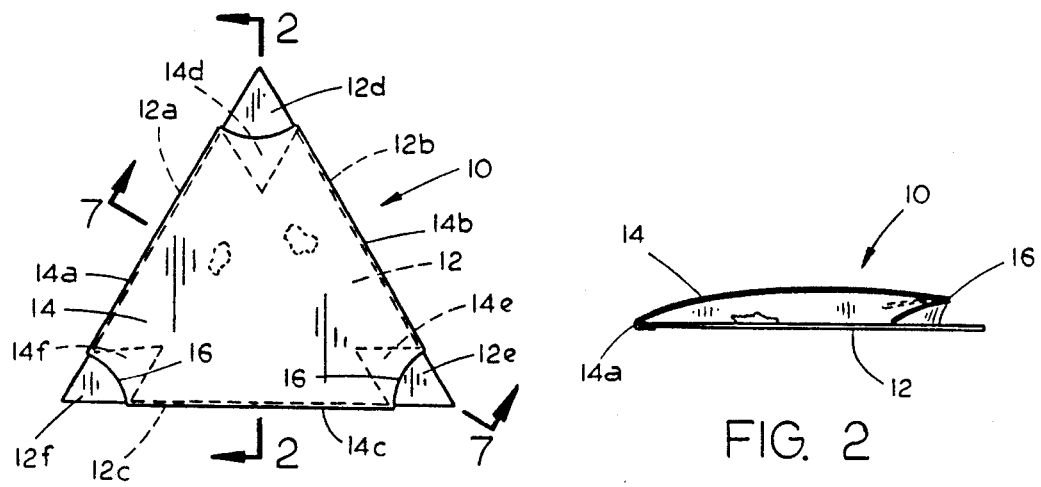
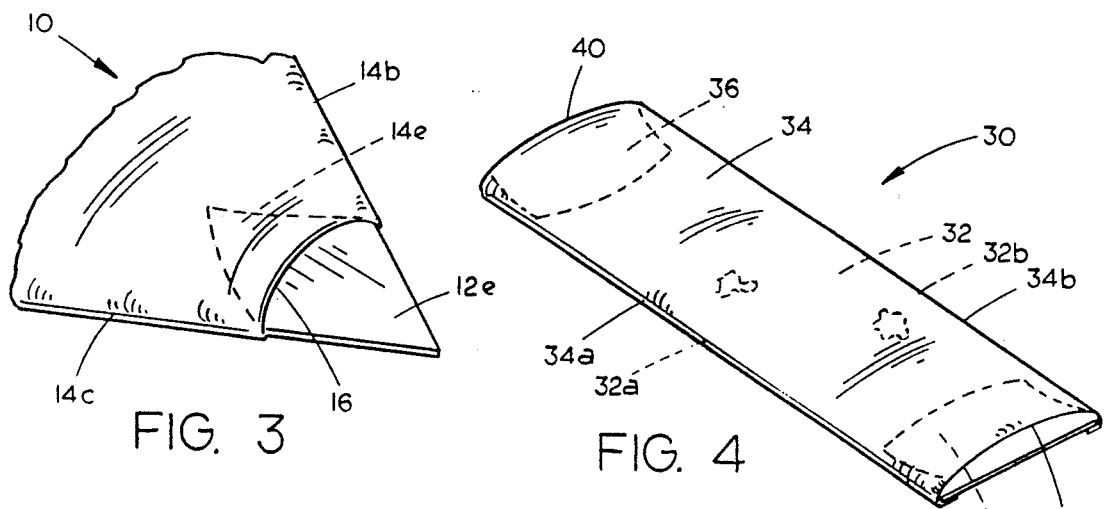
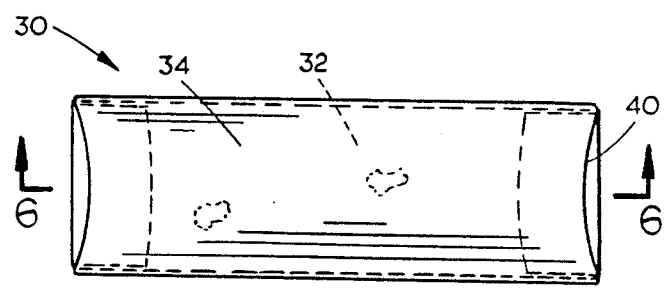
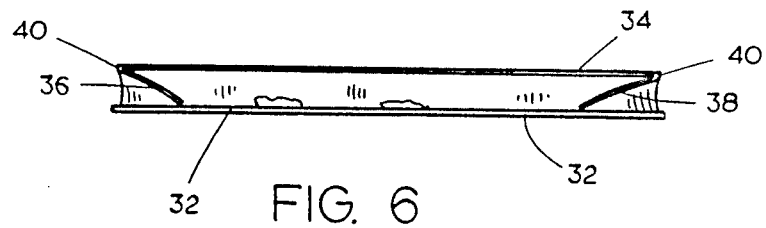

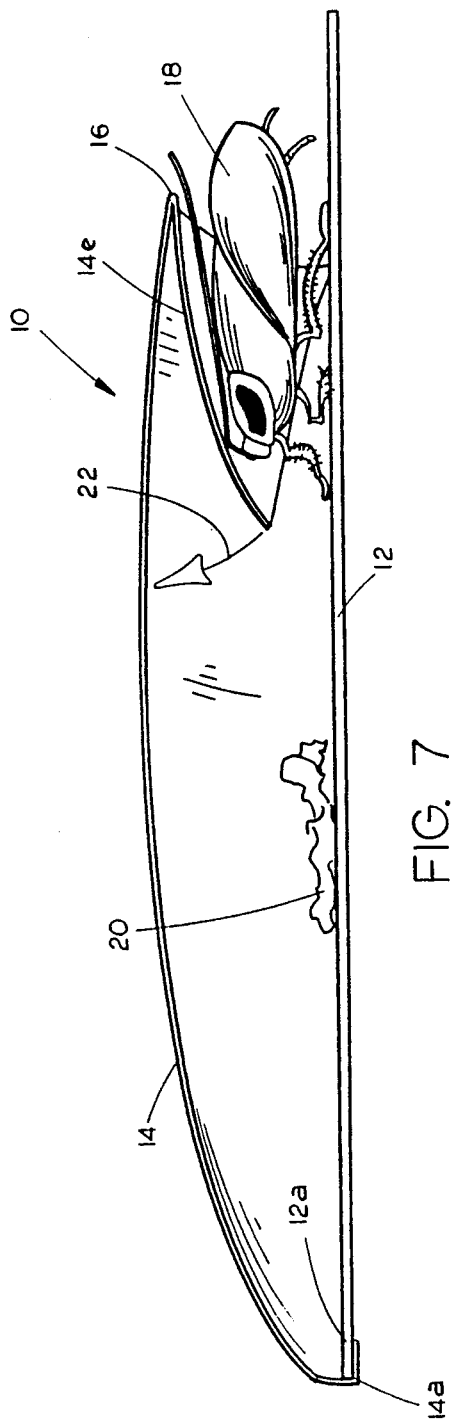
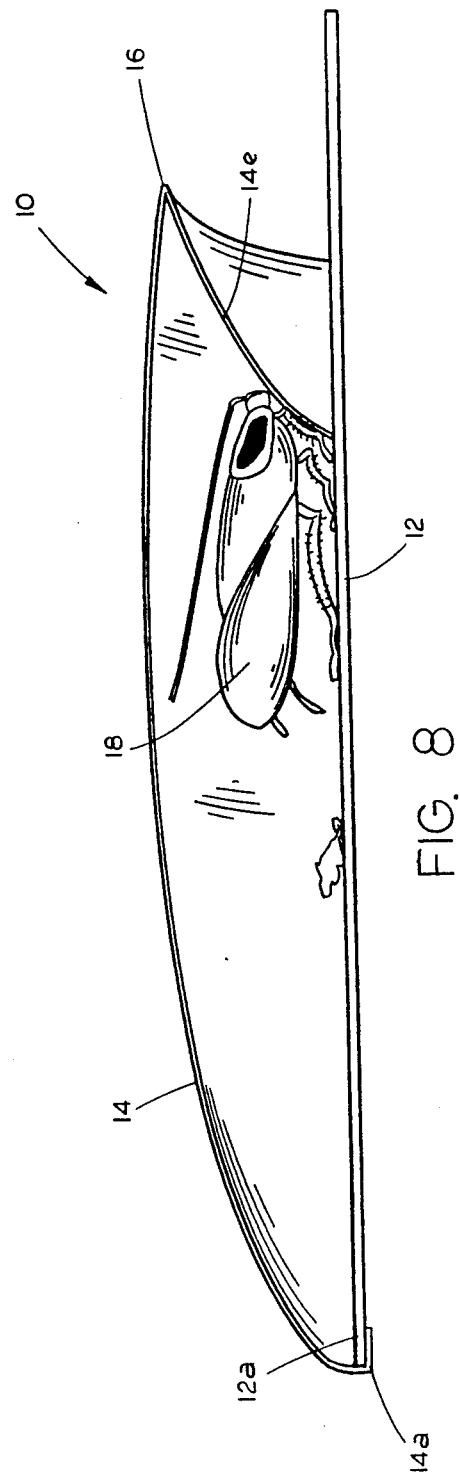

4,998,376

INSECT TRAP

TECHNICAL FIELD

The present invention relates generally to insect traps, and more particularly to an improved insect trap which does not rely on the use of adhesives or the like to maintain the insect within the trap.

BACKGROUND OF THE INVENTION

Cockroaches and insects are a pest which are common in many homes. There are a wide variety of products available on the market today which attempt to control these pests, with varying degrees of success. These pest controls may be categorized in two general categories: (1) sprays or the like, and (2) traps.

There are wide variety of sprays available which are applied to surfaces which may be contacted by cockroaches or other insects. Unfortunately, such sprays commonly have an unpleasant odor, and may stain the surface upon which they are applied. There is always a concern that the spray could contaminate human food products, as well. Furthermore, the cockroach does not necessarily die instantly upon contact with the spray, and may travel some distance before the effects of the spray become lethal.

Conventional traps typically utilize an adhesive applied on a surface within a box or other container. An insect may then be attracted to bait within the box, and thereby comes into contact with the adhesive. The box may then be disposed of as desired. The major problem with such traps, is that the adhesive will not retain its potency for a long period of time. Furthermore, an insect must contact a substantial portion of its body to the adhesive to produce a bond with enough strength to retain the insect in place.

It is therefore a general object of the present invention to provide an improved insect trap.

Another object of the present invention is to provide an insect trap which does not require insecticides of any type.

A further object is to provide an insect trap which will not lose its strength or entrapment effect after a period of time.

Yet another object of the present invention is to provide an insect trap which is extremely economical to manufacture, and simple to use.

These and other objects of the present invention will be apparent to those skilled in the art.

SUMMARY OF THE INVENTION

The insect trap of the present invention includes a lightweight base having a lightweight cover formed of a flexible sheet material. The cover is affixed along portions of the base's continuous edge, and includes flap portions folded between the cover and base. The cover is affixed to the base such that the fold between each flap portion and the cover is arched upwardly away from the base to create a downward biasing force on each flap portion. This biasing force will return the flap portion into contact with the base once an insect has lifted the flap to enter the trap.

BRIEF DESCRIPTION OF THE DRAWINGS

FIG. 1 is a top view of the insect trap of the present invention;

FIG. 2 is sectional view taken at lines 2—2 in FIG. 1;

FIG. 3 is an enlarged perspective view of one corner of the invention shown in FIG. 1;

FIG. 4 is a perspective view of a second embodiment of the invention;

FIG. 5 is a top view of the embodiment shown in FIG. 4;

FIG. 6 is a sectional view taken at lines 6—6 in FIG. 5;

FIG. 7 is a sectional view taken at lines 7—7 in FIG. 1, with an insect entering the trap; and FIG. 8 is a sectional view similar to FIG. 7, with an insect retained within the trap.

DESCRIPTION F THE PREFERRED EMBODIMENTS

Referring now to the drawings, in which identical or corresponding parts are identified with the same reference numeral, and more particularly to FIGS. 1–3, the insect trap of the present invention is designated generally at 10.

Insect trap 10 includes a triangular-shaped flat base 12 of a lightweight material such as cardboard. A generally triangular-shaped sheet of lightweight plastic material is mounted to base 12 and aligned therewith. Plastic sheet 14 is slightly larger than base 12, such that side edges 14a, b and c of plastic sheet 14 may be wrapped around and attached to the bottom surface of corresponding side edges 12a, b and c.

Side edges 14a, b and c are affixed to base 12 only to an extent which leaves corners 14d, e and f unattached from corresponding corners 12d, e and f on base 12. Corners 14d, e and f are then folded into the space between plastic sheet 14 and base 12, as shown in FIGS. 1–3. Each fold on corners 14d, e and f is designated generally at 16 so as to form an arch spaced upward and away from base 12. As shown in FIG. 2, arch 16 forms corner 14e into a generally arcuate panel, which in turn biases corner 14e downwardly into contact with base 12.

Referring now to FIGS. 7 and 8, a super-enlarged sectional view of the invention shows the operation thereof. An insect 18 is drawn to bait 20 and will push up on corner 14e of lightweight plastic sheet 14 as shown by arrow 22. Once the insect has moved completely within trap 10, the biasing force on corner 14e, produced by arch 16, will cause corner 14e to fall back into contact with base 12, as shown in FIG. 8. As insect 18 turns around in an attempt to escape from trap 10, it will encounter corner 14e. Pressure against 14e will only serve to increase the contact with base 12. At most, the insect will be able to climb atop corner 14e, thereby preventing escape. Cockroaches and insects are incapable of maneuvering to lift corner 14e to escape from trap 10, and thereby are permanently retained within the trap. Furthermore, other insects may enter the trap 10 without permitting the escape of insects already within the trap. Because of the downward biasing force placed on corner 14e by the arched fold 16, corner 14e will consistently return to contact with base 12 after an insect has entered trap 10.

Referring now to FIGS. 4–6, a second embodiment of the invention is designated generally at 30 and includes a generally rectangular base 32 and a lightweight plastic cover 34 wrapped over the upper surface of base 32.

Plastic cover 34 has a width slightly greater than the width of base 32 such that the longitudinal edges 34a and 34b of plastic cover 34 may be wrapped under and affixed to the longitudinal edges 32a and 32b of base 32.

A pair of end flaps 36 and 38 project from the opposing ends of lightweight plastic sheet 34 and are tucked inwardly between cover 34 and base 32, as shown in the drawings. An arch 40 is formed in the fold of panels 36 and 38 so as to create a downward biasing force on flaps 36 and 38, which holds flaps 36 and 38 in contact with base 32 (as shown in FIG. 6). In this way, flaps 36 and 38 will permit entrance of an insect, yet will prevent escape of the insect after entrance in the trap 30.

Whereas the invention has been shown and described in connection with the preferred embodiments thereof, it will be understood that many modifications, substitutions and additions may be made which are within the intended broad scope of the appended claims. There has therefore been shown and described an improved insect trap which accomplishes at least all of the above-stated objects.

I claim:

1. An insect trap comprising:
   a base having a continuous peripheral edge;
   a lightweight cover of flexible sheet material, of a weight capable of permitting an insect to lift one layer to pass thereunder and having dimensions greater than the base, affixed along portions of the peripheral edge of said base to form a continuous seal along portions of the base edge;
   said cover having flap portions formed by each location at the cover's edge which is not affixed to said base, folded under said cover to project between said cover and said base;
   said cover being affixed to said base such that the fold between each said flap portion and the cover is arched upwardly away from the base to create a downward biasing force on each said flap portion.

2. The insect trap of claim 1, wherein said cover is formed of a lightweight plastic material.

3. The insect trap of claim 1, wherein said base and cover are generally triangular in shape, and wherein each corner of said cover is a flap portion.

4. An insect trap, comprising:
   a substantially flat base member having upper and lower surfaces and a peripheral edge;
   a sheet of lightweight flexible material connected to said base member so as to substantially cover the upper surface thereof;
   said sheet being connected to said base to form at least one opening and a continuous seal along portions of said peripheral edge;
   said sheet having a flap located at the opening, folded to extend between said sheet and base;
   said sheet being connected to said base to form a space between said sheet and base, and such that the fold of said flap forms an arch to create a downward biasing force on said flap to bias the flap into contact with the base.

* * * * *